SELF THREADING TYPE TAPE RECORDER/REPRODUCER

Filed Nov. 20, 1962

INVENTOR
FRIEDRICH LOUZIL
BY Frank R. Trifari
AGENT

United States Patent Office 3,195,792
Patented July 20, 1965

3,195,792

SELF THREADING TYPE TAPE RECORDER/REPRODUCER

Friedrich Louzil, Vienna, Austria, assignor to North American Philips Company, Inc., New York, N.Y., a corporation of Delaware Filed Nov. 20, 1962, Ser. No. 238,901
Claims priority, application Austria, Nov. 20, 1961, A 8,734/61
9 Claims. (Cl. 226—92)

This invention relates to an improved automatic threading magnetic tape recorder/reproducer of the type disclosed in the copending application of Missriegler et al., Serial No. 114,893, Patent No. 3,104,843, assigned to the assignee hereof. Tape recorders of this type have a slide and associated catch for transferring tape from a supply magazine to a take-up reel or take-up magazine. The slide is held in a guide whereby it can move from the vicinity of the supply source to the take-up location. The catch on the slide engages a tag fixed to the tape or tape leader for transferring the tape from the supply source to the take-up. In accordance with the above-identified patent the catch is moved into engagement with the tag simultaneous with movement of the slide. In the arrangement according to this invention a mechanism is provided to cause engagement of the catch and tag prior to movement of the slide carrying the catch.

Connecting the catch and tag of the tape by means of a device fixed on the recorder/reproducer affords an important advantage in that only the catch will be transported by the slide which, during movement between the supply and take-up spools, must pass the magnetic magnetic heads, driving capstan etc. and create the least possible disturbance thereto.

The invention and further elaboration thereon will now be given with reference to embodiments shown by way of example, in the accompanying diagrammatic drawing.

Figures 1, 2:
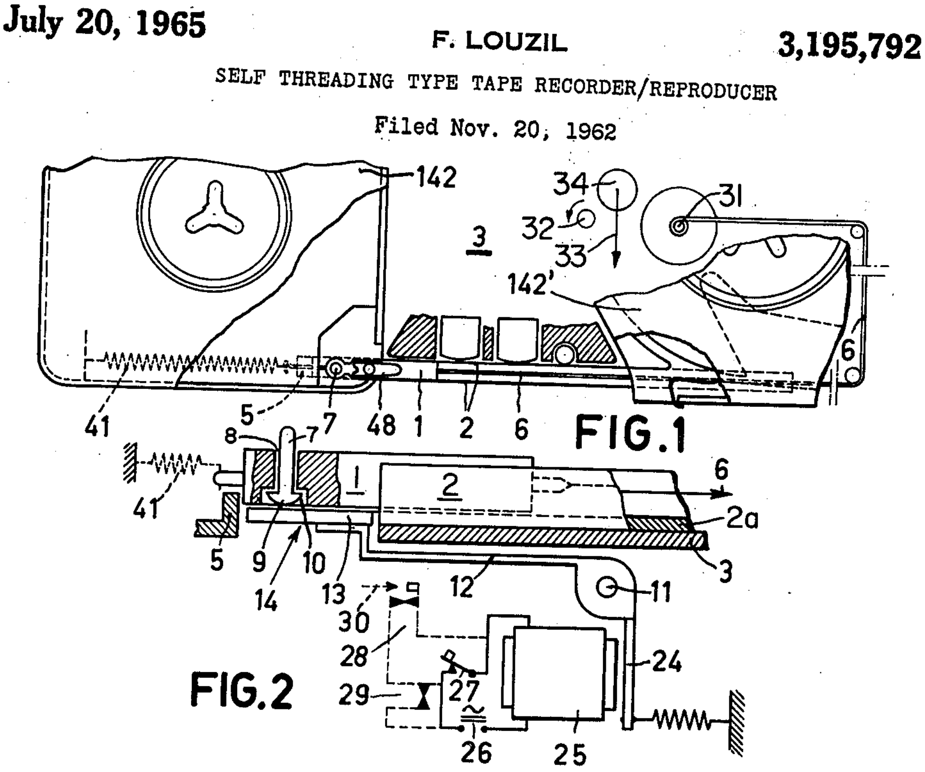
FIG. 1 is a diagrammatic illustration of the invention in combination with a recorder/reproducer of the type disclosed in the above-identified application.
FIG. 2 is a schematic side view illustrating the improvement according to the invention and showing, partly in longitudinal section, a slide having a catch which is adapted to move up and down in a bore and which is brought into its operating position by means of an electromagnet.

In the recorder/reproducer illustrated in FIG. 1 supply and take-up magazines 142 and 142' respectively are shown. However, the take-up magazine 142' may be replaced by a take-up spool. The supply of magnetic tape is preferably housed in a magazine 142 as shown at the left in FIG. 1. The magazines and/or spools for supplying and reeling the tape are placed on conventional spindles (not shown) and along the path of the tape, between its supply and take-up positions, magnetic pick-up, driving spindle, etc. are located in any suitable manner. A tag 48 is affixed to the one end of the tape within the supply magazine and this tag is engaged by finger or catch 7. The catch 7 draws the tag 48 along the guide path 2 and introduces the tag into the flange of the take-up spool which is suitably slotted for this purpose.

The foregoing briefly describes the illustration of FIG. 1 and the principle of operation of the recorder/reproducer of the type disclosed in the aforementioned patent.

Figures 3, 4:
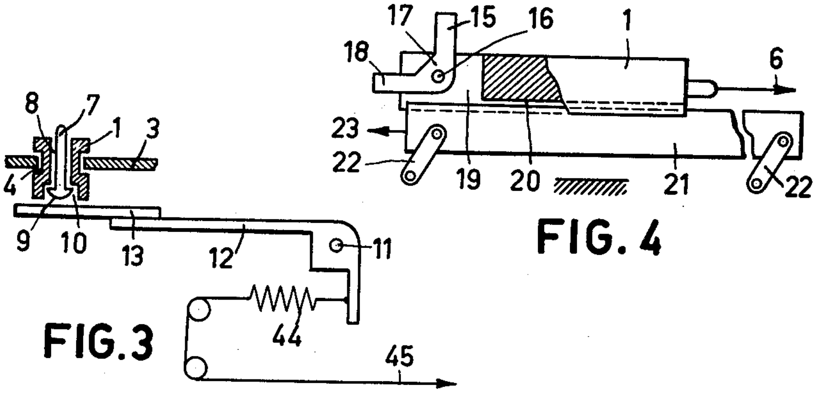
FIG. 3 is a schematic cross-sectional view of a variant of the slide and catch device shown in FIG. 1.
FIG. 4 is a schematic side view, partly in longitudinal section, of a device having a pivoted catch.

The improvement according to the subject invention is shown in detail in the illustration of FIGS. 2–5. The catch 7 of FIGS. 2 and 3 is located below the magazine 142 (FIG. 1) either on the tape deck 3 (FIG. 2) or in the tape deck 3 which is suitably slotted as indicated in FIG. 3. Also of course the supply and take-up spools for magazines may be elevated on bosses (not shown). The slide 1 is shaped externally as an elongated block having a recess hereinafter described. Said block may be of metal, synthetic material or any suitable material. A guide path 2 for the slide has a form or shape matching that of the slide and extends between the supply magazine and take-up spool of the recorder/reproducer. Neither the magazine nor the take-up spool form part of this invention and are therefore not illustrated in FIGS. 2–5.

In the arrangement shown in FIG. 2 the guide path 2 is U-shaped and bears on a plate or tape deck 3, for example, the chassis plate of the apparatus. In the arrangement shown in FIG. 3, the slide 1 has a groove 4 on each side receiving a plate, for example the edges of a slotted chassis plate or tape deck 3. The initial position of the slide 1 near the magazine 142 is determined by an abutment 5, as shown, for example, in FIG. 2. The drive for the slide 1, which may be realized in numerous ways from hand drive to electrical drive, is shown as a traction rope 6 in FIGS. 2 and 4, the other end of which is connected with a suitable pulley driven from the recorder motor (FIG. 1).

In the arrangements shown in FIGS. 2 and 3, a finger-like catch 7 may be moved up and down in a perpendicular bore 8 of the slide 1. To this end, the catch 7 has a head 9 which is preferably countersunk in a recess 10 of the slide in the operating position of the catch 7. A lever 12 pivotable about a spindle 11 and carrying a plate 13 is arranged below the head 9. Upon lifting the plate 13, the catch 7 is brought into its operating position (as shown). If the action of gravity is not sufficient to lower the catch 7 in the bore 8 when the plate 13 moves down, a small helical spring (not shown) may be provided in the recess 10 for this purpose. In the arrangement shown in FIG. 2, the underside of guide 2 is closed, therefore, catch 7, once lifted, is maintained in its operating position by the guide during the whole forward and backward movement of the slide. Thus, when the plate 13 is lifted, prior to the beginning of the movement of the slide, aperture 14, provided in the tape deck 3 at the area where the catch 7 is situated in the initial position of the slide, is closed. Thereafter, the aperture 14 may be opened since the guide surface *2a* for the slide will maintain the catch 7 in the desired position.

In the arrangement shown in FIG. 3 the tape deck 3 has an opening throughout the length of the guide path. Therefore, plate 13 extends throughout the length of the path of the slide and the catch 7 may be lowered at any arbitrary point of this path, for example, at the final position of the slide near the winding device, thus permitting the slide 1 to perform its backward movement with the catch 7 lowered or withdrawn.

In the embodiment shown in FIG. 4, a pivotal catch 17 is constituted by limbs 15 and 18 pivotable about a spindle 16. The swinging movement takes place by means of the second limb 18. The slide 1 has a recess 19 to receive the V-shaped part 17. The right hand catch of the slide 1 is provided, at its underside, with a longitudinal groove 20. When left to itself, the V-shaped catch 17 in the initial position of the slide 1 occupies a position in which the limb 18 points downward. To this end, a small auxiliary spring (not shown) can be provided, if necessary. The limb 15, which serves as the catch, then lies within the recess 19 of the slide and is thus inactive or inoperative. To place said limb in its operating position, one of the longitudinal edges of plate 21 is slid from below into the groove 20. To this end, the plate 21 is journalled on two parallel levers 22 so that it may be lifted by pulling or pushing in the direction indicated by an arrow 23. As in the arrangement shown in FIG. 3, it is particularly simple in this arrangement to move the catch 15 out of its operating position as soon as the slide has reached its final position near the winding device. As in the arrangement of FIG. 3, the guide for the slide also has a slot along its length for the passage of the plate 21.

Numerous mechanical and/or electric arrangements may be utilized for moving the catch 7 or 17 to its operating position. Thus the term "operating-device" is to be understood in this specification to mean not only the member to be operated directly by hand, for example, the pushbutton in a mechanical arrangement, or the switch controlling a current circuit in an arrangement with an electromagnet, but all parts mechanical or electric bringing about the movement, including those parts which serve to fix the operating parts in their operating positions, for example, a lock, or, in the case of an electromagnet, a holding contact.

In the embodiment shown in FIG. 2, the catch 7 and the plate 13 provided on the lever 12 for the displacement of the plate, are connected to an electromagnetic operating-device. An arm 24 of the lever 12 is formed as the armature of an electromagnet or relay 25. The circuit of the electromagnet 25, which is fed from a current source 26, is opened or closed by means of a manual switch 27. In FIG. 2, the circuit is shown closed by switch 27 and thus the catch 7 is lifted into its operating position. Increased operating ease and protection against improper operation are obtained if the operating-device is further provided with two contacts as shown in dashed lines in FIG. 2, namely a holding contact 29 which is to be closed by the armature 24 and a biased or normally closed break contact 28 which is provided with a feeler (not shown) in the path of the slide 1 so as to be opened by the slide at the moment the slide, upon reaching its final position near the winding device, abuts said feeler when moving in the direction indicated by an arrow 30. In this case, it suffices to form switch 27 as a resilient push button which has to be closed only momentarily to energize the holding contact 29. Such a push button may readily be incorporated into a unit for remote control. The arrangements shown in FIGS. 3 and 4 may also be operated electromagnetically in the same or similar manner.

While not shown, if it is desired to use a purely mechanical operating-device, for example, a rotatable switch (cam disc), or a reciprocal cam which is maintained in position by a lock after movement, the arrangement may be designed so that either the moving part of the operating-device is directly connected to the catch, for example by means of the lever 12, together with the plate 13 (FIGS. 2 and 3), directly constituting part of the operating-device, with an intermediate member, for example, a traction rope (45 in FIGS. 3 and 5) provided between the catch and the operating-device to permit the operating-device to be arranged at an arbitrary place in the apparatus. In such mechanical arrangements the lock may be released by the slide in the manner indicated above when the latter reaches its final position near the winding device. Arrangements in which the lock or a part thereof lies directly in the path of the slide are possible, as well as those in which the release takes place through intermediate members operated by a feeler in the path of the slide.

Maximum operating simplicity and maximum protection against improper operation may be obtained by using the operating-device for both establishing the operating position of the catch and also for operating a drive for the slide present on the apparatus. Such an arrangement is shown diagrammatically in FIG. 5.

Figure 5:
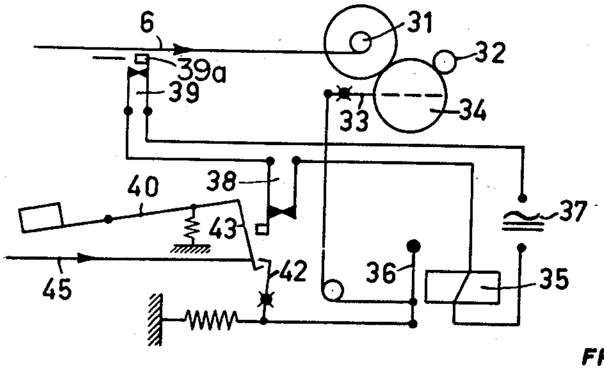
FIG. 5 shows diagrammatically an operating-device for operating both the catch and a drive for the slide.

According to FIG. 5, a transfer device (guide, slide and catch) designed, for example, as shown in any of FIGS. 2, 3 or 4, is driven via a traction rope 6 wound on a shaft 31 which in turn is driven by a pinion 32, on the recorder motor shaft, via an intermediate wheel 34 pivotable by means of a lever 33. A pull magnet (relay) 35 is provided for operating lever 33 which is connected to the armature 36 whereby, when the armature 36 is attracted, the intermediate wheel 34 is urged against the pinion 32 and the pulley 31 so that rope 6 is wound thereon. Two contacts are provided in the circuit of the magnet 35 fed from a current source 37, namely a make contact 38 and a break contact 39. The make contact 38 is closed when a push button 40 is actuated so that the magnet 35 is energized and the movement of the slide begins. The parts of FIG. 5 are shown in this condition. The break contact 39 is provided with a feeler 39$a$ in the path of the slide so as to be opened by the slide as soon as it reaches its final position, at which position, the current circuit is interrupted and the drive switched off. A backsetting spring 41 (shown in dashed line in FIG. 2) may be provided for the return movement of the slide. In order that the drive remains inoperative after the return movement of the slide has set in, the push button 40 is provided with a lock 42 which is biased to opened position and is also made operative by the armature 36 upon energization of the magnet 35. When the contact 39 and hence the circuit of the magnet 35 is interrupted by the slide, the push button 40 is released in any suitable manner such as by a spring and the contact 38 is also reopened.

Operation of the push button 40 may also bring the catch 7 (FIGS. 2 and 3) into its operating position and maintains it therein until the drive for the slide becomes operative. This may be achieved by means of a rope 45, swinging the lever 12 with the plate 13 (FIG. 3), or of the plate 21 (FIG. 4), secured to a push button lever 43 (FIG. 5) so that the catch is completely lifted before the contact 38 is closed as the button 40 is depressed further. An equalizing spring 44 (FIG. 3), for example, can be provided in the rope, if necessary.

While not shown, other arrangements fulfilling the functions set out above may have numerous variants. For example, an electromagnet with a circuit as shown in FIG. 2 may be provided for operating the catch as well as for energizing a circuit of the drive for the slide. Also purely mechanical means may be provided, for example, in addition to the arrangement of FIG. 5 above described, a push button on the recorder may be also used to pivot the intermediate roller 34 which is then held in position in any known manner by a lever or the like and released only upon the slide reaching its final position to trip the means holding the intermediate roller 34 against the drive pinion 32.

As above indicated the rod or lever of a push button may be designed to bring the catch 7 or 17 into its operating position during the first part of its movement and thereafter pivot roller 34 against the shaft 31, and pinion 32 which winds the rope 6.

It will be apparent that the above is given by way of example only and is not intended to limit the appended claims to the specific arrangements illustrated and described.

I claim:

1. In a recorder/reproducer apparatus having a slide adapted to transfer magnetic tape from a supply spool to a take-up spool the improvement comprising a catch means movably mounted on said slide from an operative to an inoperative position, means supported on said apparatus for contacting and moving said catch means into gripping engagement with said tape, guide means receiving said slide and for contacting and maintaining said catch means in engagement with said tape upon movement of said slide toward said take-up spool, and means for moving said slide.

2. In a recorder/reproducer apparatus having a slide adapted to transfer magnetic tape from a supply spool to a take-up spool the improvement comprising guide means receiving said slide, catch means movably mounted on said slide from an operative to an inoperative position, means pivotally supported on said apparatus for contacting, moving and maintaining said catch in gripping engagement with said tape upon at least the initial movement of said slide toward said take-up spool, and means for moving said slide.

3. In a recording/reproducing apparatus having a slide adapted to transfer magnetic tape from a supply spool to a take-up spool the improvement comprising a catch supported on said slide for movement from an operative position engaging said tape to an inoperative position, means including an operating device for sequentially moving said slide and contacting and moving said catch into said operative position upon movement of said slide, and guide means receiving said slide and maintaining said catch in engagement with said tape.

4. In a recording/reproducing apparatus having a slide adapted to transfer magnetic tape from a supply spool to a take-up spool the improvement comprising guide means extending between said slide and take-up spools and receiving said slide, a catch supported on said slide for movement from an operative position engaging said tape to an inoperative position, means including an operating device for sequentially moving said slide and contacting, moving and maintaining said catch in engagement with said tape upon movement of said slide in said guide means; said last mentioned means also including a plate pivotally supported on said apparatus for movement into engagement with said catch whereby said catch is contacted, moved and maintained in engagement with said tape.

5. In a recorder/reproducer apparatus having a slide adatped to transfer magnetic tape from a supply spool to a take-up spool the improvement comprising guide means receiving said slide, catch means movably mounted on said slide from an operative to an inoperative position, means supported on said apparatus for moving said catch into gripping engagement with said tape, means for moving said slide, and means in the path of movement of said slide for disengaging said catch and said tape.

6. In a recording reproducing apparatus having a slide adapted to transfer magnetic tape from a supply spool to a take-up spool the improvement comprising guide means receiving said slide, a catch supported on said slide for movement from an operative position engaging said tape to an inoperative position, means comprising an operating-device for sequentially moving and maintaining said catch in engagement with said tape and moving said slide in said guide and means in the path of movement of said slide for disengaging said catch and said tape adjacent said take-up spool.

7. In a recorder/reproducer apparatus having a slide adapted to transfer magnetic tape from a supply spool to a take-up spool the improvement comprising a slide having an aperture movably receiving a catch means, a guide means receiving said slide, means for moving said catch for gripping said tape, means for moving said slide, and means in the path of movement of said slide for disengaging said catch and said tape.

8. In a recorder/reproducer apparatus according to claim 7 wherein said means for gripping and disengaging said catch and said tape comprises a plate supporting said catch, a pivotal arm supporting said plate and electromagnetic means having an armature for pivoting said arm whereby said catch and said tape are engaged, said electromagnetic means having an energizing circuit including holding contacts closed by said armature and break contacts having feeler means in the path of movement of said slide for opening said break contacts whereby said energizing circuit is opened and said catch and tape are disengaged.

9. In a recorder/reproducing apparatus according to claim 7 wherein said means for gripping and disengaging said catch and tape comprises a plate supporting said catch over the length of said guide means, a pivotal lever arm supporting said plate and electromagnetic means having an armature for pivoting said arm whereby said catch and said tape are engaged, said electromagnetic means having an energizing circuit including holding contacts closed by said armature and break contacts having feeler means in said guide means adjacent said take-up spool for opening said break contacts whereby said energizing circuit is opened and said catch and tape are disengaged; and said means for moving said slide including a traction rope secured to said slide at one end and a windup roll at the other end, and means secured on said lever arm adapted to sequentially engage said windup roll with the motor spindle of said apparatus after said lever arm has engaged said catch and tape whereby said slide is stopped adjacent said take-up spool.

References Cited by the Examiner

UNITED STATES PATENTS

| | | | |
|---|---|---|---|
| 2,891,736 | 6/59 | Blaes | 226—92 X |
| 3,006,650 | 10/61 | Ellmore. | |
| 3,025,011 | 3/62 | Camras. | |
| 3,085,346 | 4/63 | Allander et al. | 226—91 X |
| 3,104,843 | 9/63 | Missriegler. | |
| 3,119,574 | 1/64 | Laa | 242—55.13 |

FOREIGN PATENTS

| | | |
|---|---|---|
| 716,632 | 10/54 | Great Britain. |

ROBERT B. REEVES, *Acting Primary Examiner.*

RAPHAEL M. LUPO, SAMUEL F. COLEMAN, *Examiners.*